(12) United States Patent
Angiolelli

(10) Patent No.: US 12,587,562 B2
(45) Date of Patent: Mar. 24, 2026

(54) CYBERSECURITY AUTOMATED THREAT INTELLIGENCE AND ATTACK MITIGATION SYSTEM

(71) Applicant: Frank Angiolelli, Milford, PA (US)

(72) Inventor: Frank Angiolelli, Milford, PA (US)

( * ) Notice: Subject to any disclaimer, the term of this patent is extended or adjusted under 35 U.S.C. 154(b) by 37 days.

(21) Appl. No.: 18/665,307

(22) Filed: May 15, 2024

(65) Prior Publication Data

US 2024/0388602 A1 Nov. 21, 2024

Related U.S. Application Data

(60) Provisional application No. 63/502,409, filed on May 15, 2023.

(51) Int. Cl.
H04L 9/40 (2022.01)

(52) U.S. Cl.
CPC ...... H04L 63/1458 (2013.01); H04L 63/1433 (2013.01)

(58) Field of Classification Search
CPC ........................ H04L 63/1458; H04L 63/1433
See application file for complete search history.

(56) References Cited

U.S. PATENT DOCUMENTS

| | | | | |
|---|---|---|---|---|
| 12,069,083 B2 * | 8/2024 | Hawthorn | ........... | H04L 63/1433 |
| 12,309,188 B1 * | 5/2025 | Al Ghazo | ........... | H04L 63/1433 |
| 2006/0265489 A1 * | 11/2006 | Moore | ............... | H04L 67/1095 |
| | | | | 709/223 |
| 2007/0061266 A1 * | 3/2007 | Moore | ................... | G06Q 50/00 |
| | | | | 705/51 |
| 2007/0061487 A1 * | 3/2007 | Moore | ................... | G06F 16/27 |
| | | | | 707/E17.032 |
| 2007/0168461 A1 * | 7/2007 | Moore | ................... | G16H 10/60 |
| | | | | 709/217 |
| 2008/0040151 A1 * | 2/2008 | Moore | ................... | G16H 40/67 |
| | | | | 705/2 |

(Continued)

OTHER PUBLICATIONS

Signivis SRL, "Best Antivirus Software", Antivirus Guide. https://www.antivirusguide.com/best-antivirus-software/?Ip=default &utm_source=microsoft&utm_medium=cpc&sgv_medium=se.

*Primary Examiner* — Richard G Keehn
(74) *Attorney, Agent, or Firm* — Lawrence P. Zale; Zale Patent Law, Inc.

(57) ABSTRACT

A Cybersecurity Automated Threat Intelligence and Attack Mitigation System mitigate the effects of a Mass Data Breach, a Malware Attack, and Distributed Denial of Service (DDoS) attacks on a Monitored System protected by a system administrator (referred to as a "SysAdmin"). A System Analyzer identifies the Monitored Systems' hardware, software, and configuration information ("Elements"). A Search Term Extractor processes RSS Feeds, news articles, and other information relating to past cybersecurity attacks ("Articles") to identify search for each type of attack and related to vulnerabilities of elements of the Monitored Systems. Each Live Article is compared to predetermined search terms to identify if it implies attacks or vulnerabilities. The criticality is also determined. If the Live Article indicates the vulnerability of elements or a specific attack, a notification is sent to the SysAdmin and the persons responsible for each vulnerable element. The System may implement 'hardening' of the Monitored Systems if the severity is high.

21 Claims, 6 Drawing Sheets

(Operation)

(56) References Cited

U.S. PATENT DOCUMENTS

| | | | | |
|---|---|---|---|---|
| 2009/0228973 A1* | 9/2009 | Kumar | ................ | H04L 63/0272 |
| | | | | 726/15 |
| 2013/0104251 A1* | 4/2013 | Moore | ................. | G06F 21/602 |
| | | | | 726/30 |
| 2013/0291060 A1* | 10/2013 | Moore | ................. | H04L 63/105 |
| | | | | 726/1 |
| 2014/0215621 A1* | 7/2014 | Xaypanya | ............. | H04L 63/145 |
| | | | | 726/23 |
| 2016/0359872 A1* | 12/2016 | Yadav | ................ | H04L 63/1425 |
| 2018/0368007 A1* | 12/2018 | Cummings | ............. | H04L 67/51 |
| 2020/0412759 A1* | 12/2020 | Metzger | ............. | H04L 63/1433 |
| 2024/0275817 A1* | 8/2024 | Grout | ................ | H04L 63/1425 |
| 2024/0420133 A1* | 12/2024 | Dappuri | ................ | G06N 5/022 |

* cited by examiner (Setup)

(Operation)

(Operation)

From step
1077

1080

Opt: auto run
protective s-ware 1081

Opt: reroute around
Elements 1083

Opt: auto shut down
Elems. 1085

Opt: auto config
firewalls 1087

Opt: auto virtualize
Elems. 1089

To step 1091

(Operation)

(Setup)

(Operation)

CYBERSECURITY AUTOMATED THREAT INTELLIGENCE AND ATTACK MITIGATION SYSTEM

CROSS-REFERENCE TO RELATED APPLICATION

The current application claims priority to U.S. Provisional Patent application 63/502,409, filed May 15, 2023, having the same Inventor as the current application, and incorporates it as if it were fully set forth in its entirety here, to the extent that it does materially conflict with the content disclosed in this application.

STATEMENT REGARDING FEDERALLY SPONSORED RESEARCH

Not Applicable.

BACKGROUND

1. Field of Invention

The present invention relates to a cybersecurity early warning and protection tool that provides cybersecurity teams with focused and relevant surveillance, notifications, and protection of computing systems by analyzing the computing system, monitoring and analyzing public chatter, identifying vulnerabilities relating to elements of the computing system, and types of imminent attacks, then taking steps to 'harden' vulnerabilities and reduce the severity of these attack.

2. Description of Related Art

In the realm of cybersecurity, attacks cause significant damage to persons and property every year. These attacks can range from a data breach of private information, loss of privacy, loss of data, financial loss, locking drives and computers, and/or a distributed denial of service (DDoS). They can even extend to taking over control of computer-operated systems, such as pipelines, power plants, and other infrastructure.

Over time, vulnerabilities are uncovered in existing hardware, software, and system configurations. Once known, hackers can take advantage of the vulnerabilities to attack systems.

Some actions can be taken to mitigate or avoid attacks, such as taking part or all a computer system offline during the attack, running additional anti-malware software, and virtualizing system functions. However, these actions slow or stop the systems from performing their common duties.

Cybersecurity attacks occur randomly, so we do not know when we will be hit with one.

It would be beneficial to have an early-warning system that can notify system operators when vulnerabilities are found in a system. It is also beneficial to notify persons ultimately responsible for elements of a system immediately after an attack is sensed so they can prepare the systems to minimize the effects of a cybersecurity attack.

It would also be beneficial to have an early warning system that 'learns' from past chatter and gets smarter to predict when there will be an attack, the type of attack, and the vulnerability elements that may be the target of the attack.

BRIEF SUMMARY OF THE INVENTION

This invention reads published information on the internet to identify only relevant and focused information that must be acted on to mitigate imminent cybersecurity attacks. After reading the information, the invention categorizes the nature of the attack and the severity, identifies any area of geographic focus (e.g., Country being targeted), threat adversaries involved, and technologies that are involved. Once completing that assessment, the system will then make notifications to requested parties based on the specific content and may be used to implement changes to computer systems, network devices, or other computerized systems that mitigate the Cyber Security attack automatically.

The automated cybersecurity system 2000 for monitoring and mitigating effects of a cybersecurity attack on Systems to be Protected, also referred to as the "Monitored Systems" 2013 may be described as having:

a System Hardware Analyzer 2011 that keeps a current listing of the hardware, software, and systems configuration or systems architecture ("Elements") of each of the Monitored Systems 2013;

a Receiver 2003 that reads online news articles, RSS feeds and other cybersecurity notices ("Current Articles");

a Vulnerability Identifier 3009 with access to preloaded Vulnerability Search Terms that reviews the Current Articles to identify and select Vulnerability Articles highly related to the System Architecture (or Elements) of at least one of the Monitored Systems 2013; and a Classifier 3001 with access to preloaded Malware, Data Breach, and Distributed Denial of Service (DDoS) Search Terms.

The innovative system also includes a Classifier 3001 reviews Current Articles to identify if they correlate with the Malware, Data Breach and Distributed Denial of Service (DDoS) Search Terms, and activates the appropriate analyzer;

a Malware Analyzer 3003 is activated if the Classifier 3001 indicates that the Live Article correlates with a Malware Attack and extracts Malware Information and criticality from the Live Article;

a Data Breach Analyzer 3005 is activated if the Classifier 3001 indicates that the Live Article correlates with a Data Breach Attack and extracts Data Breach Information and criticality from the Live Article; and a DDoS Analyzer 3007 is activated if the Classifier 3001 indicates that the Live Article correlates with a DDoS Attack and extracts DDoS Information and criticality from the Live Article; and a Vulnerability Identifier 3009 receives predetermined Vulnerability Search Terms and the System Architectures, Elements, of the Monitored Systems 2013 and analyzes the Live Article to identify if Vulnerability Information indicating elements of the Monitored Systems 2013 has vulnerabilities.

An Article Summarizer 3011 is coupled to the Malware Analyzer 3003, the Data Breach Analyzer 3005, and the DDoS Analyzer 300, and the Vulnerability Identifier 3009, and receives the Malware, Data Breach, and DDoS information, as well as Vulnerability Information, creates a summary from the received information and notifies a system administrator 3, (which is referred to as "SysAdmin" throughout this application) if the criticality is above a first threshold.

It also includes a Communication Device coupled to the Vulnerability Identifier 3009 that receives preloaded contact information of a Responsible Person for each element of the Monitored Systems 2013 that was identified as being vulnerable and sends the Summary to each Responsible Person.

The Automated Cybersecurity System 2000 according to the current invention may also include:

an Automated Test Device 3015 that causes elements of the Monitored Systems 2013 to run tests to check the health of the elements and determine if any are currently compromised.

In an alternative embodiment, the system of the current invention may also include:

a System Hardening Device 3017 to harden Monitored Systems 2013 and their elements identified as vulnerable against the type of attacks identified in the Selected Articles.

The System Hardening Device performs at least one of the following actions;

such as taking vulnerable elements offline;

replacing vulnerable elements with virtualized elements;

running additional anti-malware software when the Malware Analyzer 3003 indicates a high probability of a malware attack;

shutting down ports on a firewall when the Data Breach Analyzer 3005 indicates a high probability of a data breach attack; and shutting down ports on a firewall when the Distributed Denial of Service (DDoS) Analyzer 3007 indicates a high probability of a DDoS attack.

The current invention may also be described as:

a method of protecting Monitored Systems 1023 comprising the steps of:

preloading the Search Term Storage 2009 with 'Vulnerability Search Terms' indicating vulnerabilities of Elements of the system architectures and search terms indicative of different types of cybersecurity attacks;

downloading and storing cybersecurity articles describing cybersecurity attacks and related information, ("Past Articles") from a source into a Raw Storage 2007; and acquiring and storing a by a Systems Analyzer 201, Elements and Architecture Information of the Monitored Systems 2013 in a Systems Architecture Storage 2015.

The current invention may determine Malware Search Terms by the steps of:

identifying a word frequency of Selected Malware Articles indicating a malware attack in Search Term Storage 2009 being the Malware Word Frequency;

identifying a word frequency (General Frequency) of the same word in a set of general articles randomly chosen;

identifying those words with the greatest difference between the General Frequency and the Malware Word Frequency as relevant Malware Search Terms.

The current method can determine Data Breach Search Terms by the steps of:

identifying a word frequency of Selected Data Breach Articles indicating a Data Breach in Search Term Storage 2009 being a Data Breach Word Frequency;

identifying a word frequency (General Frequency) of the same word in a set of general articles randomly chosen; and identifying those words with the greatest difference between the General Frequency and the Data Breach Word frequency as relevant Data Breach Search Terms.

The current method can determine Distributed Denial of Service (DDoS) Search Terms by:

identifying a word frequency of Selected Distributed Denial of Service (DDoS) Articles in Search Term Storage 2009 being a DDoS Word Frequency;

identifying a word frequency (General Frequency) of the same word in a set of general articles randomly chosen;

identifying those words with the greatest difference between the General Frequency and the DDoS Word frequency as relevant DDoS Search Terms.

The current method also identifies hardware, software, and systems configurations of the Monitored Systems 2013; and stores this information in a System Architecture Storage 2015.

The current invention functions to accept a newly-received online article ('Live Article') relating to cybersecurity;

identify any terms in the Live Article similar to Vulnerability Search Terms and if found, extract Vulnerability Information from the Live Article;

identify any terms in the Live Article similar to Malware Search Terms and if found, extract Malware Information from the Live Article;

identify any terms in the Live Article similar to Data Breach Search Terms and if found, extract Data Breach Information from the Live Article;

identify any terms in the Live Article similar to DDoS Search Terms and, if found, extract DDoS Information from the Live Article.

If criticality found in the Live Article is above a threshold, then the current system immediately sends the extracted information to SysAdmin 3.

If criticality found in the Live Article is above a second threshold, then a summary is created of any vulnerabilities or possible cybersecurity attacks identified in the Live Articles by a Communication Device 3019 and sent to the Contact Persons previously assigned to each hardware device, software element, and system configuration.

The method of the current invention may further include running 'hardening' actions on the Monitored Systems 1023 having elements identified as vulnerable in the Live Articles.

An alternative embodiment of the method of the current invention, may further include the steps of running 'hardening' actions on the Monitored Systems 1023 against cybersecurity attacks identified in the Live Articles.

BRIEF DESCRIPTION OF THE DRAWINGS

The invention's advantages described in this application will become more apparent when read with the exemplary embodiment described in the specification and shown in the drawings. Further, the accompanying drawings and descriptions that follow, like parts are indicated throughout the drawings and description with the same reference numerals, respectively. The figures may not be drawn to scale, and the proportions of certain parts have been exaggerated for the convenience of illustration.

DETAILED DESCRIPTION OF THE INVENTION

Figure 1A:
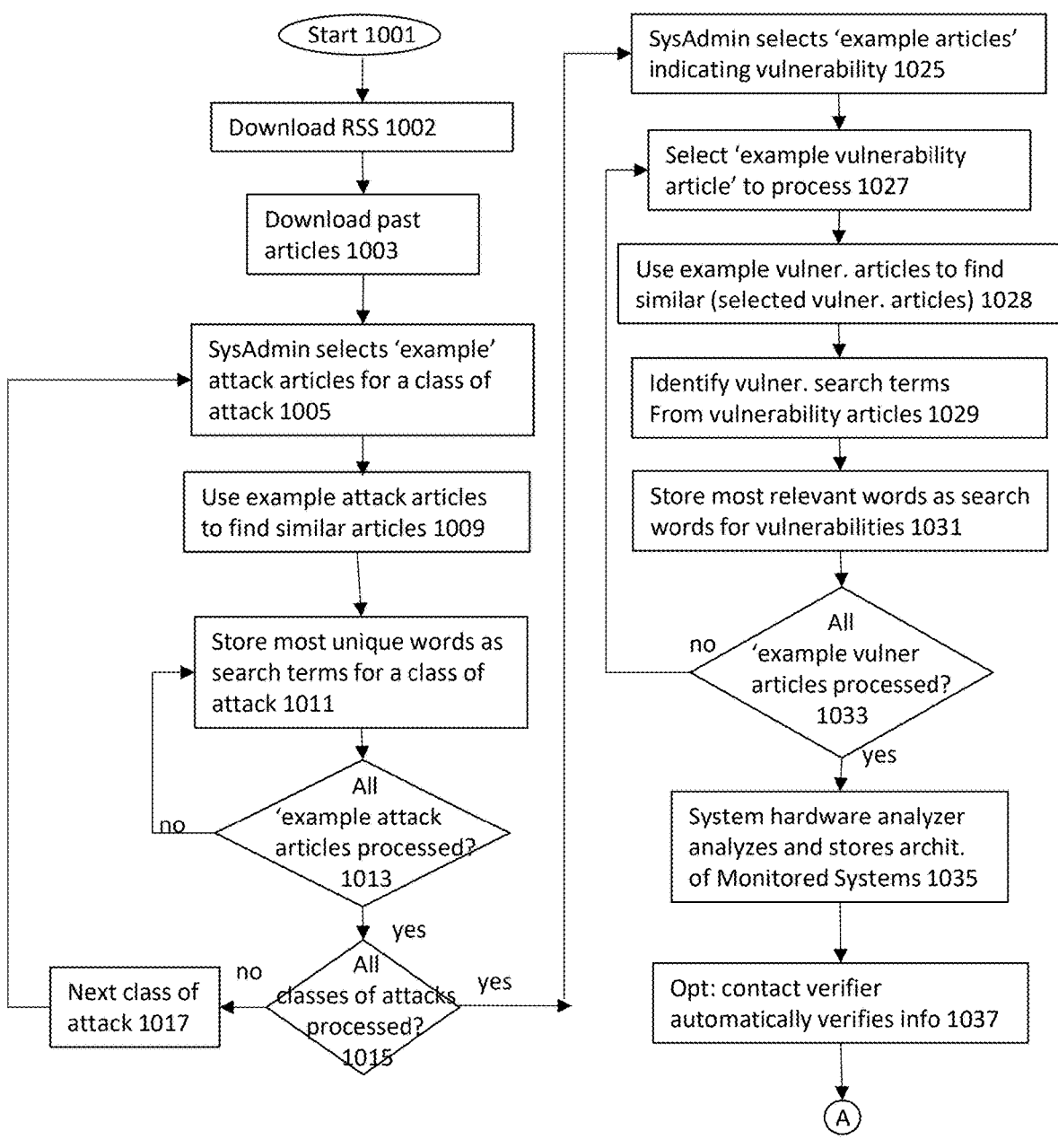
FIGS. 1A, 1B and IC together are a simplified flowchart illustrating the major steps of the functioning of one embodiment of the according to the current invention.

The present invention will now be described in detail by describing various illustrative, non-limiting embodiments with reference to the accompanying drawings. The invention may, however, be embodied in many different forms and should not be construed as being limited to the illustrative embodiments set forth herein. Rather, the embodiments are provided so that this disclosure will be thorough and will fully convey the concept of the invention to those skilled in the art. The claims should be consulted to ascertain the true scope of the invention.

The terminology used herein is to describe particular embodiments only and is not intended to be limiting of the invention. As used herein, the term "and/or" includes any and all combinations of one or more of the associated listed items. As used herein, singular forms "a," "an," and "the" are intended to include the plural forms as well as the singular forms unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefits, and each can also be used in conjunction with one or more, or in some cases all, of the other disclosed techniques. Accordingly, for clarity, this description will refrain from repeating every possible combination of the individual steps in an unnecessary fashion. Nevertheless, the specification and claims should be read with the understanding that such combinations are entirely within the scope of the invention and the claims.

1. Theory

During high-severity, broad cybersecurity attacks, there are typically public communications, news articles, and information that indicate, announce, or provide indications of a cybersecurity attack. These may be articles notifying the public of a specific vulnerability found in hardware, software, and/or systems having a specific configuration (collectively "target device"). Other attacks may take advantage of the vulnerability of the target device or system after its vulnerability is made public.

Therefore, a system administrator (referred to as a "SysAdmin"), cyber security teams, and Threat Intelligence teams are tasked with monitoring and protecting these systems. If the SysAdmin can act to 'harden' the Monitored Systems immediately after the attack is suspected, the SysAdmin has a much better chance of minimizing the damage of an attack.

Many attacks spread quickly, while some take a while (in computer time) to spread. If one hears about a specific attack that does not spread immediately, it may be possible to 'harden' the Monitored System(s) before the attack. Hardening the Monitored System will increase the chances that the Monitored System will avoid the attack or will have a reduced effect on the Monitored System. An example would be an article indicating the spread of a malware attack in Cambodia. A system administrator tasked with protecting a specific Monitored System 1023, using the tool according to the current invention will automatically a) block certain IP addresses, and domains, b) take elements of the System offline, c) activate specific anti-malware software, and d) back up information.

Therefore, quickly acquiring specific information related to which type of attack, what type of attack is occurring, what threat actors are involved, what technologies are affected and any vulnerabilities which are involved associated with the Monitored System(s) is critical. These attacks spread quickly. There should be a preprocessor that has assessed vast amounts of information that has been published (chatter), identifies items which are most likely to require immediate attention, which items are relevant to the organization and then react quickly to be effective.

It is also necessary for this System to 'learn' in advance which terms are most indicative of the various types of attacks and vulnerabilities, based upon archived chatter, but also able to adapt as the terms change over time. This includes assessing the severity of a Vulnerability, identifying both the Common Vulnerability and Exposure (CVE) number, its Common Vulnerability Scoring System (CVSS) score, the frequency of the CVE being attacked and the methods by which the vulnerability is exploited.

It is possible to create a tool that can analyze chatter, predict and defend against attacks on specific vulnerabilities that gets more accurate as it is used.

The System will require a training set used to 'prime' the System, created from selected terms from archived chatter, which most directly indicates known past attacks.

2. Implementation

Figure 2A:
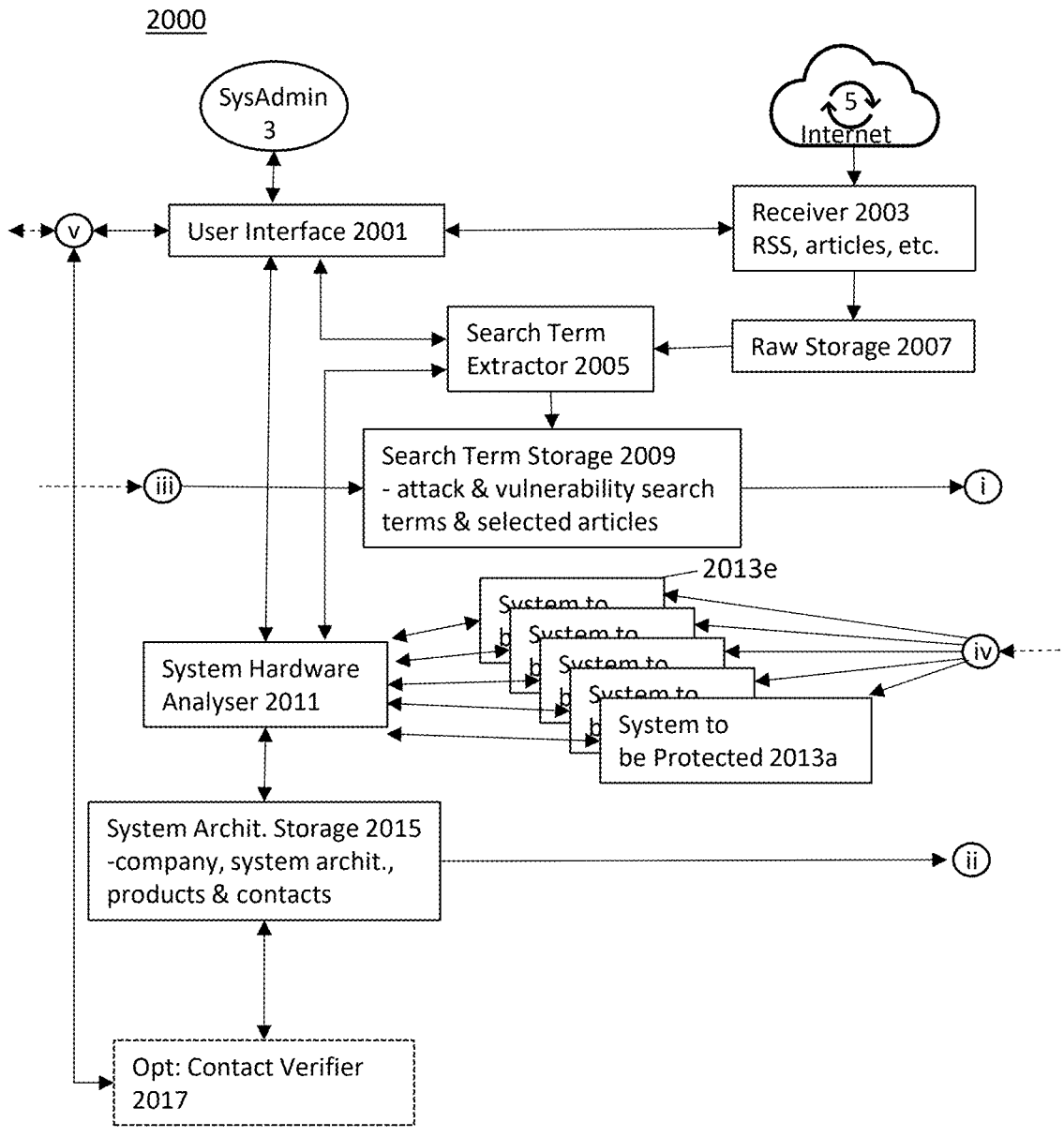
FIGS. 2A and 2B together are a simplified block diagram of a system according to one embodiment of the current invention.
Figure 2B:
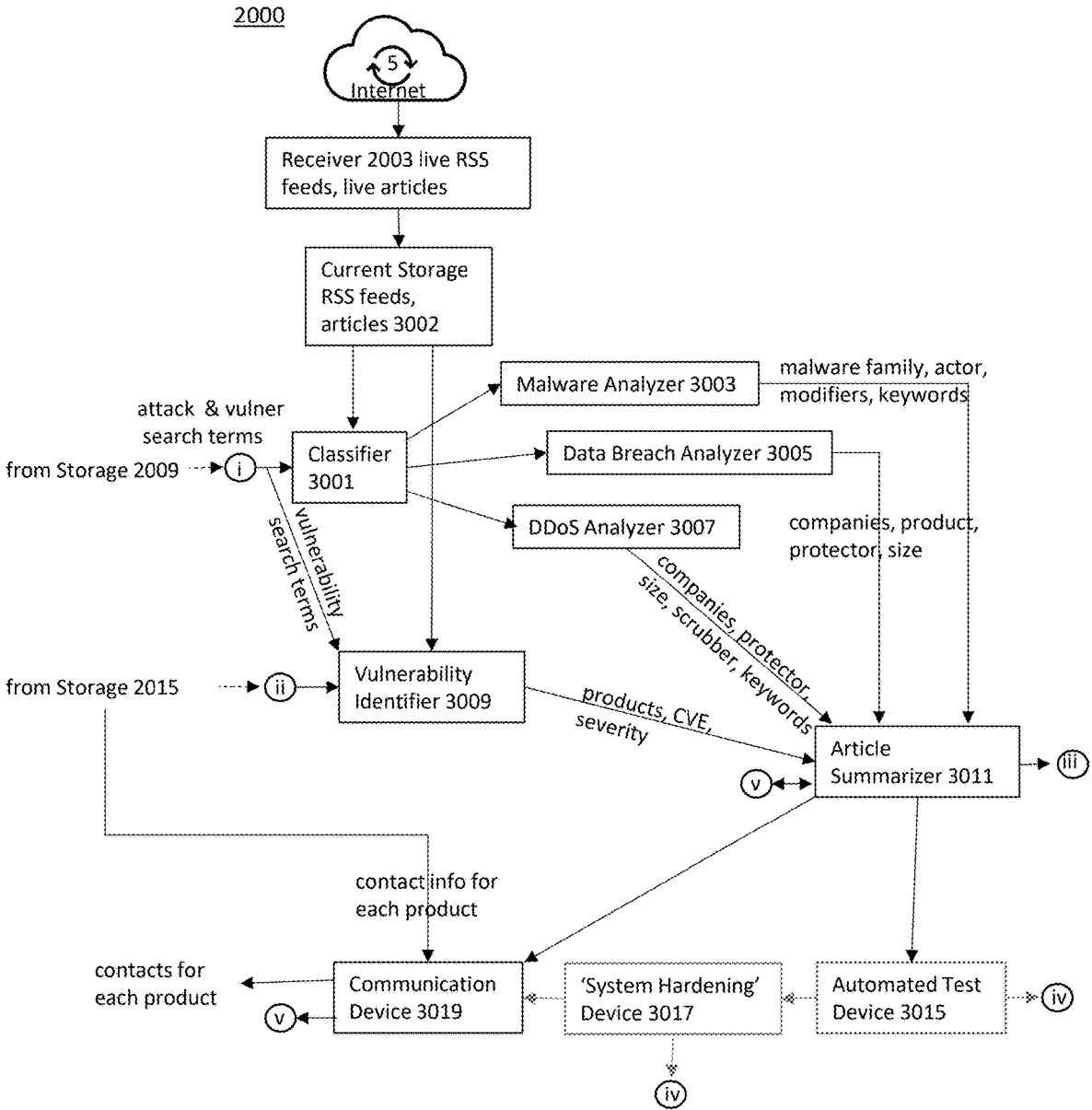

All elements shown in FIGS. 2A and 2B, except for the SysAdmin 3 and the Internet 5, are part of this embodiment of Cybersecurity Automated Threat Intelligence and Attack Mitigation System 2000 according to one embodiment of the current invention.

Setup

FIG. 2A shows a generalized block diagram of the elements in setting up the current System 2000 during setup before its actual online operation. In FIG. 2A, at least one computer system 2013*a*-2013*e* (the "Monitored Systems") is monitored and protected by the Cybersecurity Automated Threat Intelligence and Attack Mitigation System 2000, operated by the SysAdmin 3 through a User Interface 2001.

Since cyber security attacks may be targeted at specific hardware, software, and configurations of computing systems, it is important to know accurately and have updated information on the hardware, software, and configurations of the Subject Systems 2013*a*-2013*e*.

A System Hardware Analyzer 2011 is coupled to the Subject Systems 2013*a*-2013*e*. System Hardware Analyzer 2011 is operated under the control of SysAdmin 3 through a User Interface 2001 and constantly checks stores and updates the hardware, software, and configurations of subject systems 2013*a*-2013*c*.

System Hardware Analyzer 2011 stores the updated hardware, software, and configuration information in Systems Architecture Storage 2015. System Hardware Analyzer 2011 also stores information regarding a Contact Person and their company responsible for each element of the Subject System 2013. The Contact Person would be the person to contact if there are questions relating to a problem, maintenance, or upgrades of specific elements of the Monitored Systems 2013. In the worst case, the Contact Person is notified of a suspected or actual cybersecurity attack. The maintenance and operation of many systems are typically outsourced to various contractors and subcontractors. Since Subject Systems 2013 may be extensive, this may include many different companies, departments, locations, and support personnel. Preferably, a Contact Person for every element of the Subject Systems 2013 is determined before operation and stored in Systems Architecture Storage 2015 along with current contact information such as email address and text number. This information must be kept current since these people would immediately be contacted if there is a cyber-security attack and their assistance is required.

At any given time, System Hardware Analyzer 2011 should have an accurate representation of the current equipment, software, and configuration of subject systems 2013 as well as the contact person for each element of the Subject Systems 2013, their contact information, their employer, and possibly alternative contact people and their contact information.

Since this information must be current, an optional Contact Verifier 2017 periodically sends test messages to various contacts verifying that the information is accurate. If not, SysAdmin 3 is notified through User Interface 2001 to acquire updated contact information.

SysAdmin 3 also controls a Receiver 2003, which interfaces with the Internet 5 and downloads relevant cyber security information, such as RSS feeds and cyber security articles. This information will include notices of attacks that have already occurred and subsequent stories indicating the extent of the damage of the various attacks. Therefore, in hindsight, the SysAdmin 3 can identify newspaper stories and other information that accurately predicted the type, size, scope, and effect of various past attacks.

By selecting these Articles as accurate in describing the attack for each type of attack, one can build a 'seed' of information used to identify other Articles which also accurately indicate a specific type of attack.

In one embodiment, a Search Term Extractor 2005 analyzes the titles of Articles chosen by the SysAdmin 3, which indicate a specific past cybersecurity attack, such as a Mass Data Breach. In another embodiment, SysAdmin 3 provides keywords to search for a given type of attack.

The articles in Raw Storage 2007 may be searched for two or more of the keywords being within a specified number of words from each other, referred to as a "proximity search". A keyword search and a proximity search will result in Articles that are indicative of the specific cybersecurity attack selected.

These Articles are stored in Search Term Storage 2009 for each specific type of attack.

The search is not limited to keywords and proximity searches but may involve any information known about the Articles received, such as source, author, date, publication, etc. In an alternative embodiment, analyses may be made between each type of information in the Articles and their correlation to Articles with accurate predictions of a selected cybersecurity attack. This processing is done for Bulk Data Breaches, Malware, Distributed Denial of Service attacks, and stores separately.

In one embodiment, the Articles are analyzed for word frequency usage in the English Language, consistent with the application of TF-IDF algorithms tuned to Cyber Security. TF-IDF algorithm is conventionally known as "Term Frequency, Inverse Document Frequency" in which in document d, the frequency represents the number of instances of a given word t. Therefore, we can see that it becomes more relevant when a word appears in the text more often, which is rational. For each specific term in the paper, there is an entry with the value being the term frequency. Very common words are not very good at indicating a specific subject and are considered 'Noise Words'. These are set aside. For example, words that appear more often (higher word frequency) in Data Breach articles as compared with their word frequency in ordinary language are helpful in finding other Articles in the Raw Storage 2007 with the subject matter relating to similar subjects. Similarly, words with a higher word frequency in Malware articles than in ordinary language are useful in finding other Articles with subject matter relating to Malware. The same is true for words relating to Distributed Denial of Service (DDoS) attacks. The invention's algorithm approach to frequency weighting is tuned by applying additional weighting to words that have specific significance to Cyber Security, such as "massive" or "critical" (or synonyms) which have different severity ratings and frequency when used in the English language.

These may be used as keywords, and also used in proximity searches for each type of attack.

The same process may be used to find Articles that were accurate at predicting the hardware, software, and configuration vulnerabilities. Search Term Extractor 2005 will receive hardware, hardware manufacturers names, software, software creators' names of the Monitored Systems 2013 from System Hardware Analyzer 2011. These will be stored in Search Term Storage 2009 and used to search Articles separately for known or predicted vulnerabilities.

The Search Term Extractor 2005 is preprogrammed to go through the Articles (or in an alternative embodiment, titles of the articles) and ignore 'noise' words. These are words that are commonly used in language and have little relation to the unique aspects of the article. However, words which are rare in common language but more common in certain kinds of cybersecurity events are useful in finding related articles. One way of performing this is to use word frequency in common (non-technical) language vs. word frequency in a specific type of cybersecurity event. Those with the biggest word-frequency differences are those which are most relevant to finding information related to a specific cybersecurity event.

The process may be described according to the flow chart shown in FIG. 1A and the system elements are shown in FIG. 2A.

In step 1002, a Receiver 2003 receives cybersecurity information, such as RSS feeds, downloaded from various connected networks, including the Internet 5.

In step 1003 news articles and other cyber security information are also downloaded by Receiver 2003 from connected networks. The information downloaded in steps 1002 and 1003 can be collectively referred to as "Articles". These Articles relate to cybersecurity attacks that happened in the past. Since these attacks have already happened, we also have information on how the attacks played out.

In step 1005, SysAdmin 3 reads through Articles stored in Raw Storage 2007 and selects several Example Articles which were particularly accurate in describing each class of cybersecurity attack, such as a Mass Data Breach.

Since this is being done by SysAdmin 3 manually through User Interface 2001 to select several Example Articles that accurately described each class of attack.

In step 1009, the Example Articles are processed by Search Term Extractor 2005 to determine the words which are most closely associated with each class of attack. This may be done by removing 'Noise words' and using the remaining words as search terms.

The Search Term Extractor 2005 determines the word frequency of each word in an article in normal language and the word frequency of the same word in the Example Articles, for a given class of attack. The difference in these word frequencies will indicate the relevance of the word to the selected class of attack.

In step 1011, the relevant words for each type of attack are stored by Search Term Extractor 2005 in the Search Term Storage 2009.

In step 1013, it is determined in Search Term Extractor 2005 if all of the Example Articles have been processed. If not ("no"), then processing continues in step 1005 to process the remaining Articles.

If true, ("yes"), then Search Term Extractor 2005 determined in step 1015 if all the classes of attack have been processed. If not ("no"), then the next class of attack is processed.

If so, ("yes"), then in step 1025, SysAdmin 3 employs User Interface 2001 to direct Search Term Extractor 2005 to select Articles that are accurate in describing system vulnerabilities from Raw Storage 2007. (Search Term Extractor 2005 was previously populated with a listing of the equipment, software, configurations of Monitored Systems 2013, during the setup phase.)

In step 1027, Search Term Extractor 2005 selects an Example Article to process.

In step 1029, Search Term Extractor 2005, sorts the words in the Article by relevance to determine search terms to use to find Articles accurate at describing vulnerabilities.

In step 1031, the Search Term Extractor 2005 stores the search terms which identify specific vulnerabilities related to hardware, software, and configurations of Monitored Systems 2013 in Search Term Storage 2009.

In step 1033, Search Term Extractor 2005 determines if all the Example Articles for vulnerabilities have been processed. If not ("no"), then processing continues at step 1027 to process the remaining Example Articles indicating vulnerabilities.

If so ("yes"), then in step 1035, System Hardware Analyzer 2011 determines the hardware, software, and configurations of the various Subject Systems 2013 and stores the information in Systems Architecture Storage 2015.

Optionally, in step 1037, a contact verifier periodically verifies the accuracy of contact information of the Contact Persons. This may require automatically sending emails requests for updated information, and corresponding with the Contact Persons, and updating the contact information for each element of the Monitored Systems 2013.

The Setup Mode of System 2000 is complete and system 2000 is now ready to begin its Operational Mode.

Operational Mode

Cybersecurity Automated Threat Intelligence and Attack Mitigation System 2000 is tasked with continually receiving a large amount of live cybersecurity articles and information determining if any of them are relevant to any of the Monitored Systems 2013. If relevant, the class (type) of attack is determined, its severity, how widespread is the attack, and the vulnerable elements affected are identified. Depending upon the severity and how widespread the attack is, the Contact Persons for affected elements of the Monitored Systems are notified. Possibly, the health of the elements is monitored and/or the Monitored Systems are hardened.

Figure 1B:
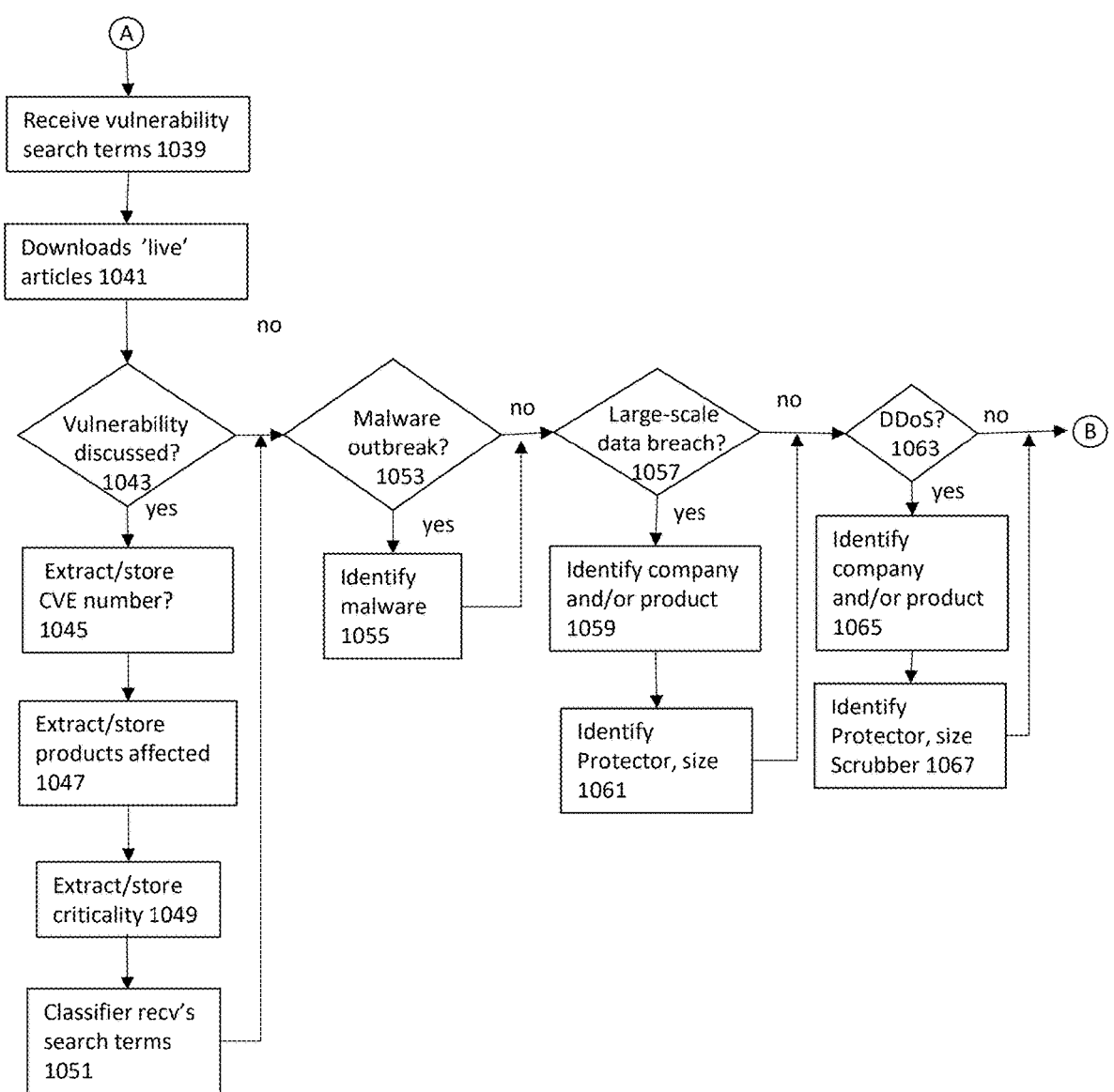

The functioning of the Cybersecurity Automated Threat Intelligence and Attack Mitigation System 2000 is described in connection with FIGS. 1B and 2B. Receiver 2003 is coupled to various networks and the Internet. In step 1035, Receiver 2003 receives and stores various live RSS feeds, News Articles, current notices, publications, and other cybersecurity information (collectively "Live Articles") which it receives and at least temporarily stores in Raw Storage 2007.

In step 1039, a Vulnerability Identifier 3009 receives search terms relating to vulnerability from Search Term Storage 2009.

In step 1041, live RSS feeds and articles are received by Receiver 2003 and stored in Current Storage 3002.

In step 1043 Vulnerability Identifier 3009 receives the Live Article and processes it by comparing its words to the search terms for vulnerability to determine if the Live Article correlates above a predetermined correlation threshold. If it does not ("no"), then processing continues at step 1053.

If it does ("yes"), then the Live Article is processed in step 1045 by Vulnerability Identifier 3009 to determine if there is a Common Vulnerabilities and Exposures (CVE) number or equivalent information. If so, the CVE is extracted and stored in an Article Summarizer 3011. The Article Summarizer 3011 utilizes Natural Language processing to read the content and condense the content into a summary having a maximum of 60 words, programmatically.

Similarly, in step 1047, Vulnerability Identifier 3009 recognizes Products, hardware elements, software, and configurations in Live Articles that are in Monitored Systems 2013 and stores them in Article Summarizer 3011.

Recognition may be performed by loading search terms identifying CVEs, Products, hardware, software, and configurations stored with the vulnerability search terms in Search Term Storage 2009. Article Summarizer 3011 updates this information in Search Term Storage 2009 (iii) with each new Live Article processed to make the system 'smarter' as it is used.

In step 1049, Vulnerability Identifier 3009 extracts and stores the criticality (CVE) of the Live Article.

In step 1051, Classifier 3001 receives search terms which indicate attack classes a) Malware outbreak, b) Data Breach, and c) Distributed Denial of Service (DDoS) from Search Term Storage 2009.

In step 1053, Classifier 3001 determines if the search terms indicate that the Live Article includes information about a Malware Outbreak. If not ("no"), then processing continues at step 1057.

If so ("yes"), the Live Article is processed by Malware Analyzer 3003 in step 1055 to identify the type of malware described in the Live Article. A list of known malware names may be stored with the attack search terms in Search Term Storage 2009 and are updated as new names are encountered. Malware Analyzer 3003 employs the search terms and the list of known malware names, and other known malware information to extract information relating to malware families, actors, modifiers, and relevant keywords.

In step 1057, Classifier 3001 determines if the Live Article describes a Large-scale Data Breach. If not ("no"), then processing continues at step 1061.

If so ("yes"), then in step 1059, Classifier 3001 activates the Data Breach Analyzer 3005 that identifies in step 1061 any information in the Live Article relating to the company that is the target of the data breach the Product (equipment, software, configuration) attacked, any large-scale data protectors, and the size of the Data Breach mentioned in the Article.

This information is also sent to Article Summarizer 3011.

In step 1063, Classifier 3001 checks for any information in the Live Article relating to a DDoS attack.

If so ("yes"), then in step 1065, Classifier 3001 activates a DDoS Analyzer 3007 that in step 1067, identifies any information in the Live Article relating to the company that is the target of the DDoS, and the product (equipment, software, configuration) attacked.

DDoS Analyzer 3007 identifies any information in the Live Article relating to a DDoS protector system involved, the size of the data breach, and any information on a data scrubber that protects against DDoS attacks. This information is sent to Article Summarizer 3011.

Figure 1C:
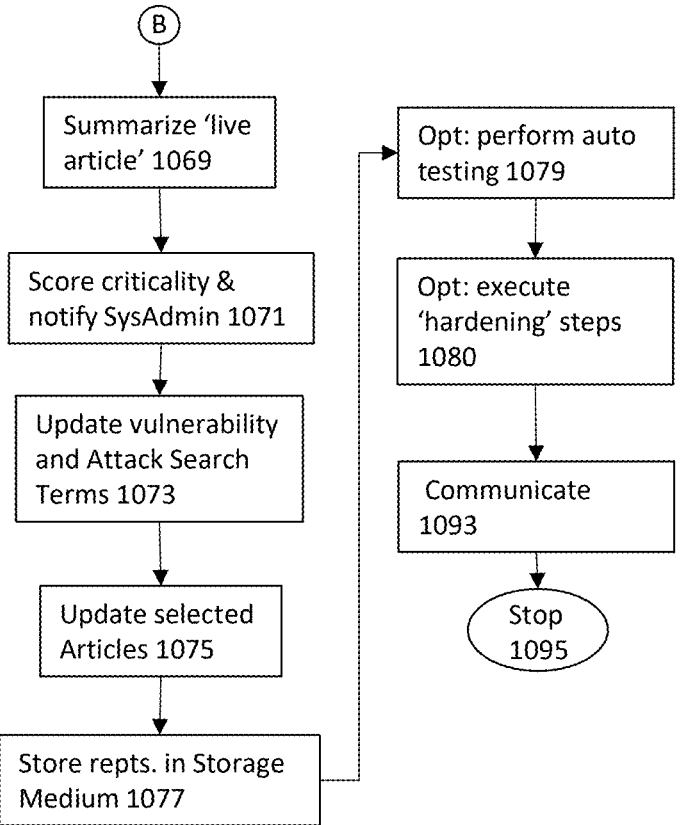
FIG. 1D is a more detailed block diagram of step 1080 of FIG. 1C.

If step 1065 is ("no"), then processing continues at step 1069 of FIG. 1C. System 2000 will not be described in connection with FIGS. 1C and 2B.

In step 1069, Article Summarizer 3011 organizes the information it has received from the Malware Analyzer 3001, the Data Breach Analyzer 3003, and the DDoS Analyzer 3007 into short summaries.

In step 1071, the criticality is scored. If the criticality is above a predetermined minimum threshold, the short summaries are immediately presented to SysAdmin 3.

In step 1073, if more relevant Vulnerability and Attack Search Terms are found in the Live Articles, the Search Term Extractor 2005 uses them to update the Search Term Storage 2009.

In step 1075, if Live Articles are found that are more representative of different types of attacks, they are used to update the Selected Articles and are stored in the Search Term Storage 2009.

In step 1077, The criticality, Attack Information, and Vulnerability Information extracted from each Live Article are sent to and stored in an Article Summarizer & Controller 3011.

Optionally, in step 1079, if the criticality is above a predetermined threshold, Automated Test Device 3015 performs auto-testing of elements of the Monitored Systems 2013 to determine their health.

The Automated Test Device 3015 also backs up critical information that can be reloaded in the event of a restart. It maintains, or duplicates information stored in multiple different systems, like asset inventory, vulnerability scanners, and firewall configurations, in a method that categorizes the information, stores it for retrieval based on relevant information, and then makes automatic assessments based on the content of the current Cyber Security Attack Search Terms to assess next steps.

If mitigation steps are necessary, the system will then initiate mitigation through either direct connectivity or through a customized Security Orchestration Automation and Response (SOAR) subsystem. (see https://www.gartner-.com/en/information-technology/glossary/security-orches-tration-automation-response-soar)

Figure 1D:
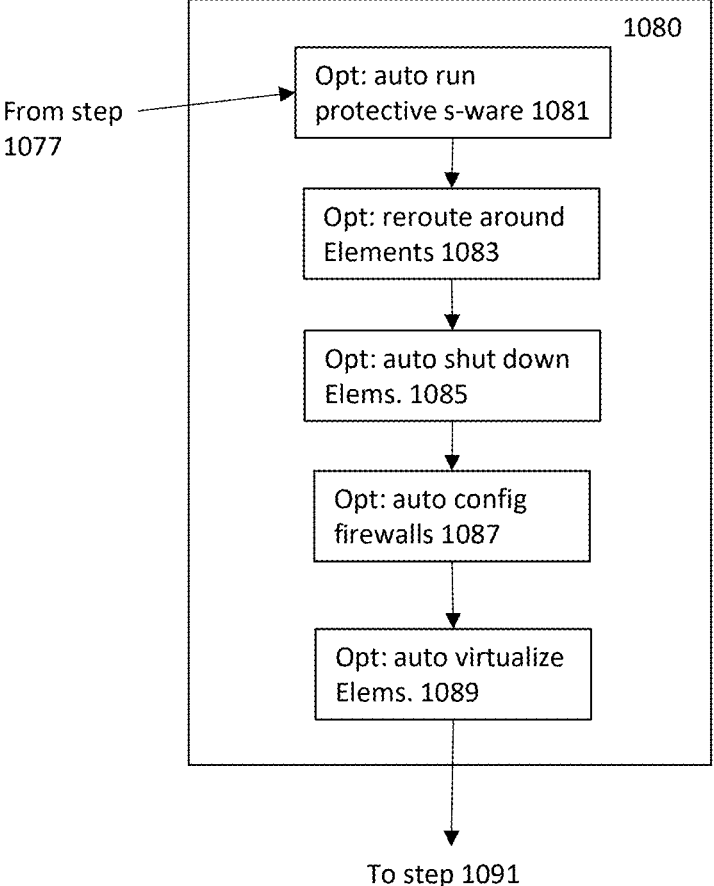

Optionally, in step 1080, the System Hardening Device 3017 takes 'hardening' steps that are more specifically shown in FIG. 1D.

In step 1093, if the Live Article meets the criticality threshold for notification, Communication Device 3019 makes notification via available technologies (e.g., email, instant messaging, SMS, or messaging) to the Contact Persons previously assigned to each hardware device, software element, and system configuration. The content of this communication includes at least the title, the summary, a link to the Live Article, and the keywords.

The process ends at step 1095.

One embodiment of the optional 'hardening' step is shown in FIG. 1D. Based upon the detected severity of the attack and the relevance to elements of the Monitored Systems, in step 1081, System 2000 may decide to run software that can reduce the effects of the attack or make System 2000 more resistant to the attack. For a sensed Malware attack, System 2000 can run anti-malware software to combat the Malware attack, including items like banning hashes, modifying the firewalls to block IP addresses or domains, filenames or other relevant Tools Techniques and Procedures (TTPs) using Application programming interfaces (APIs) coordinated through a SOAR subsystem. For a data breach, System 2000 may search relevant data stores, data classification systems or other relevant systems which assess the blast radius of attacks to identify any potential issues. System 2000 may request protection from a 'Scrubber' system for a predicted DDoS attack.

Numerous types of conventional software may be used to protect or mitigate the effects of various attacks.

If the vulnerability is very specific to a few elements of the Monitored Systems 2013 and it is possible to route traffic around these vulnerable elements, in step 1083, Hardening Device 3017 reroutes traffic around the vulnerable elements. Hardening can be performed using various methods depending on the type of attack. These methods can include banning hashes, filenames, making changes to system Group Policies, cloud configurations, blocking ports, importing Intrusion Detection signatures, blocking protocols or implementing detective rules into Endpoint Detection and Response systems. These are only listed as examples. Other conventionally known methods may also be employed.

If it is possible for System 2000 to run without the few vulnerable elements, then, optionally, Hardening Device 3017 temporarily shuts down the vulnerable elements in step 1085 until the attack is over.

If it can be determined which port the attack will come through, optionally, in step 1087, Hardening Device 3017 can reconfigure the firewall to reject any traffic through that port.

Optionally, in step 1089, if there are a small number of vulnerable hardware elements of the Monitored Systems 2013, System 2000 may replace these vulnerable elements with software emulators of the vulnerable hardware elements. Therefore, if the vulnerable element is infected or destroyed, it can simply be erased and spawned again.

These are only a few examples of ways to harden the System when information indicates a specific vulnerability, or an attack may be imminent. Other conventional methods, software, and hardware may be implemented once the specifics are known about the attack.

While the present disclosure illustrates various aspects of the present teachings, and while these aspects have been described in some detail, it is not the applicant's intention to restrict or limit the scope of the claimed systems and methods to such detail. Additional advantages and modifications will readily appear to those skilled in the art. Therefore, the teachings of the present application, in its broader aspects, are not limited to the specific details and illustrative examples shown and described. Accordingly, departures may be made from such details without departing from the spirit or scope of the teachings of the present application. Moreover, the preceding aspects are illustrative, and no single feature or element essential to all possible combinations may be claimed in this or a later application.

What is claimed is:

1. An early detection system for monitoring and protecting a plurality of Monitored Systems, comprising:

a. a Search Term Storage preloaded with search terms indicative of vulnerabilities in hardware, software, and configurations, wherein the Search Term Storage has also been preloaded with search terms indicative of various types of computer attacks;

a System Architecture Storage preloaded with terms referring to the hardware, software, and configurations ("Elements") of the Monitored Systems;

c. a Receiver, which receives online RSS feeds, and other real-time information ("live articles") and stores them in a Current Storage;

d. a Classifier coupled to Current Storage receives attack search terms from Search Term Storage, and identifies if there is a significant match between the attack search terms and terms found in the live articles;

e. a Malware Analyzer that receives live articles relating to malware and extracts malware information from these live articles;

f. a Data Breach Analyzer that receives live articles relating to data breaches and extracts Data Breach information from these live articles;

g. a Distributed Denial of Service (DDoS) Analyzer that receives live articles relating to data breaches and extracts DDoS information from these live articles;

h. a Vulnerability Identifier receives vulnerability search terms from Search Term Storage, and architecture information of Elements stored in System Architecture Storage, and identifies if there is a significant match between the terms of the live articles stored in Current Storage, and the vulnerability search terms, and if so, extracts vulnerability information from the live articles;

i. wherein Vulnerability Identifier also identifies criticality (CVE) associated with the live articles that indicate vulnerability of Elements in the Monitored Systems;

j. an Article Summarizer receives malware information from the Malware Analyzer, data breach information from the Data Breach Analyzer, DDoS information from the DDoS Analyzer, and creates a summary of relevant information;

k. wherein the Article Summarizer receives vulnerability information from the Vulnerability Identifier indicating urgency (severity), the malware information from the Malware Analyzer, the data beach information from Data Breach Analyzer and the DDoS information from the DDoS Analyzer and creates reports, such that when the urgency exceeds a predetermined threshold for any Element, the Article Summarizer sends the names of the Elements that were determined to be vulnerable, a measure of the vulnerability, the malware information, data breach information, and DDoS information to a system administrator (referred to as a "SysAdmin");

l. if the urgency exceeds a threshold for any Element, the Article Summarizer, sends an indication of the vulnerability of the Element to a Communication Device; and m. wherein the Communication Device:

i. receives the vulnerability message indicating each vulnerable Element;

ii. receives the contact information for the persons responsible for the vulnerable Elements from System Architecture Storage; and iii. notifies Responsible Person associated with each vulnerable Element.

2. The early detection system of claim 1, further comprising:

a. a Raw Storage capable of storing news articles, blog posts, social media, relating to past cybersecurity matters;

b. a Receiver is coupled to the Internet or other sources of past articles, that receives and stores the in Raw Storage;

c. a Search Term Extractor receives past articles from Raw Storage and displays them through a User Interface to a SysAdmin that selects sample terms in the past articles that represent specific cybersecurity attacks;

d. wherein Search Term Extractor then uses the sample search terms to find related past articles having similar terms and storing them in a Search Term Storage;

e. Search Term Extractor also searches through Raw Storage to find-Pass past articles relating to hardware, software, system configuration vulnerabilities, stores the past articles in Search Term Storage along with the most relevant search terms, information on the hardware, software, system configurations discussed, and related information such as the manufacturing companies, and the vulnerable products;

f. a System Hardware Analyzer is coupled to the Monitored Systems and interrogates the Monitored Systems to determine their hardware, software, system configurations, products, and manufacturers and stores the information in a System Architecture Storage;

g. wherein User Interface extracts contact information from the SysAdmin for each person responsible for hardware, software, system configurations, and products and also stores the information in System Architecture Storage.

3. The early detection system of claim 1 wherein the System Architecture Storage further comprises:

a. contact information of persons responsible for each of the hardware, software and systems configurations of each element of the Monitored Systems.

4. The early detection system of claim 1 further comprising:

a. an Automated Test Device that receives information on the vulnerable product, and performs a quick automated test to ensure that the device is still functional.

5. The early detection system of claim 1 further comprising:

a system hardening device executes at least one of:

1. Bypassing the vulnerable product,

2. Taking the vulnerable product offline,

3. Virtualizing the vulnerable product,

4. Loading and running anti-malware software.

6. A method of protecting Monitored Systems comprising the steps of:

a. preloading the Search Term Storage with vulnerability search terms indicating vulnerabilities of system architectures and search terms indicative of different types of cybersecurity attacks;

b. downloading and storing cybersecurity articles describing cybersecurity attacks and related information, ("past articles") from a source into a Raw Storage;

c. acquiring and storing a System Hardware Analyzer Architecture Information of the Monitored Systems in a Systems Architecture Storage;

d. reviewing the past articles, and selecting a small number of them ("example attack articles") through a User Interface interacting with a SysAdmin, as indicative of various types of cybersecurity attacks;

e. identifying articles (selected attack articles) similar to the example attack articles in the past articles;

f. extracting unique search terms for each type of cybersecurity attack from the example attack articles and selected articles by a Search Term Extractor; and g. storing the unique search terms for each type of attack in a Search Term Storage;

h. selecting example vulnerability articles from the past articles that indicate vulnerability, i. searching for articles ("selected vulnerability articles") similar to the example vulnerability articles;

j. extracting unique search terms for vulnerability from example vulnerability articles and the selected vulnerability articles;

k. storing the extracted search terms in the Search Term Storage;

l. Identifying the hardware, software, and systems configurations of the Monitored Systems; and m. storing this information in a System Architecture Storage;

n. accepting a newly-received online article ("live article") relating to cybersecurity;

o. identifying any terms in the live article similar to vulnerability search terms and if found, extract vulnerability information from the live article;

p. identifying any terms in the live article similar to malware search terms and if found, extract malware information from the Live articles;

q. identifying any terms in the live article similar to data breach search terms and if found, extract data breach information from the live article;

r. identifying any terms in the live article similar to DDoS search terms and, if found, extract DDoS information from the live article;

s. if criticality is above a threshold, then immediately send extracted information to SysAdmin;

t. if criticality is above a second threshold, then send extracted information to a previously determined responsible person;

u. sending a notification through a Communication Device, via available technologies to the contact person previously assigned to each hardware device, software element, and system configuration of any vulnerabilities or possible cybersecurity attacks identified in the live articles.

7. The method of claim 6, further comprising the steps of: running hardening actions on the Monitored Systems having elements identified as vulnerable in the live articles.

8. The method of claim 6, further comprising the steps of: running hardening actions on the Monitored Systems against cybersecurity attacks identified in the live articles.

9. The method of claim 8, wherein the step of running hardening actions comprise at least one of the steps of:

a. running protective software, b. routing processing around elements that are indicated to be vulnerable, c. specifically configuring firewalls to exclude a suspected attack portal; and d. virtualize functions of a suspected vulnerable element.

10. The method of claim 6 wherein the architecture information comprises at least hardware, software, and systems configurations.

11. The method of claim 6, wherein the malware information extracted from the live article comprises:

a. malware name, b. malware family, c. actor, d. modifiers, and e. search terms.

12. The method of claim 6, wherein the data breach information extracted from the live article comprises:

a. companies that were the targets, b. product affected, c. protector employed, and d. an estimation of the data breach size.

13. The method of claim 6, wherein the DDoS information extracted from the live article comprises:

a. companies that were the targets, b. search terms, c. a scrubber employed, d. protector employed, and e. an estimation of the data breach size.

14. The method of claim 6 wherein the step of extracting search terms comprises the steps of:

a. identifying a word frequency of selected articles for vulnerability in Search Term Storage being the vulnerability word frequency;

b. identifying the word frequency in a set of general articles randomly chosen;

c. identifying those with the most difference between the identified frequencies as the most relevant vulnerability search terms.

15. The method of claim 6 wherein the search terms are determined by the steps of:

a. identifying a word frequency of selected malware articles indicating a malware attack in Search Term Storage being the malware word frequency;

b. identifying a word frequency (general frequency) of the same word in a set of general articles randomly chosen;

c. identifying those words with the greatest difference between the general frequency and the malware word frequency as relevant malware search terms.

16. The method of claim 6 wherein the search terms are determined by the steps of:

a. identifying a word frequency of selected data breach articles indicating a data breach in Search Term Storage being a data breach word frequency;

b. identifying a word frequency (general frequency) of the same word in a set of general articles randomly chosen;

c. identifying those words with the greatest difference between the general frequency and the data breach word frequency as relevant data breach terms.

17. The method of claim 6 wherein the search terms are determined by the steps of:

a. identifying a word frequency of selected Distributed Denial of Service (DDoS) articles in Search Term Storage being a DDoS word frequency;

b. identifying a word frequency (general frequency) of the same word in a set of general articles randomly chosen;

c. identifying those words with the greatest difference between the general frequency and the DDoS word frequency as relevant DDoS search terms.

18. An Automated Cybersecurity System for monitoring and mitigating effects of a cybersecurity attack on monitored systems comprising:

a. a System Hardware Analyzer that keeps a current listing of the hardware, software, and systems configuration ("Elements") of each of the monitored systems;

b. a Receiver that reads online news articles, RSS feeds and other cybersecurity notices (current articles);

c. a Vulnerability Identifier with access to preloaded vulnerability search terms that reviews the Current Articles to identify and select Vulnerability Articles highly related to the Elements of at least one of the Monitored Systems;

d. a Classifier with access to preloaded, malware data breach and Distributed Denial of Service (DDoS) Search Terms;

e. wherein the Classifier reviews current articles to identify if they correlate with the malware data breach and Distributed Denial of Service (DDoS) search terms, and activates the appropriate analyzer;

f. a Malware Analyzer is activated if the Classifier indicates that the live article correlates with a malware attack and extracts malware information and criticality from the live article;

g. a Data Breach Analyzer is activated if the Classifier indicates that the live article correlates with a data breach attack and extracts data breach formation and criticality from the live article and h. a DDoS Analyzer is activated if the Classifier indicates that the live article correlates with a DDoS attack and extracts DDoS information and criticality from the Live Article;

i. a Vulnerability Identifier receives predetermined vulnerability search terms and the Elements of the Monitored System and analyzes the Live Article to identify if vulnerability information indicating elements of the Monitored Systems has vulnerabilities;

j. an Article Summarizer is coupled to the Malware Analyzer, the Data Breach Analyzer, and the DDoS Analyzer, and the Vulnerability Identifier, receives the malware, data breach, and DDoS information, as well as Vulnerability Information and creates a summary and notifies a SysAdmin if the criticality is above a first threshold;

k. a Communication Device is coupled to the Vulnerability Identifier and receives preloaded contact information for a responsible person for each element of the Monitored Systems which was identified as being vulnerable, and notifies each responsible person.

19. The Automated Cybersecurity System of claim 18 further comprising:

an Automated Test Device that causes elements of the Monitored Systems to run tests to check the health of the elements and determine if any are currently compromised.

20. The Automated Cybersecurity System of claim 19 further comprising:

a System Hardening Device 3017 to harden Monitored Systems and their elements identified as vulnerable, against the type of attacks identified in the selected articles.

21. The Automated Cybersecurity System of claim 19 wherein System Hardening Device performs at least one of the following actions;

a. taking vulnerable elements offline;

b. replacing vulnerable elements with virtualized elements;

c. running additional anti-malware software when the Malware Analyzer indicates a high probability of a malware attack;

d. shutting down ports on a firewall when the Data Breach Analyzer indicates a high probability of a data breach attack; and e. shutting down ports on a firewall when the Distributed Denial of Service (DDoS) Analyzer indicating a high probability of a DDoS attack.

\* \* \* \* \*